United States Patent [19]

Miki

[11] Patent Number: 4,461,492
[45] Date of Patent: Jul. 24, 1984

[54] SEAT BELT ASSEMBLY

[75] Inventor: Hiroyuki Miki, Yokohama, Japan

[73] Assignee: Nissan Motor Co., Ltd., Yokohama, Japan

[21] Appl. No.: 363,575

[22] Filed: Mar. 30, 1982

[30] Foreign Application Priority Data

Apr. 15, 1981 [JP] Japan ................................ 56-56783

[51] Int. Cl.³ ............................................ B60R 21/00
[52] U.S. Cl. .................................. 280/806; 280/808; 297/472; 297/480
[58] Field of Search ............... 280/801, 802, 803, 804, 280/805, 806, 808; 297/468, 469, 475, 472, 471, 480

[56] References Cited

U.S. PATENT DOCUMENTS

| 3,438,674 | 4/1969 | Radke et al. | 280/805 |
| 3,973,650 | 8/1976 | Nagazumi | 280/805 |
| 4,142,692 | 3/1979 | Andres | 280/806 |
| 4,201,418 | 5/1980 | Reidelbach et al. | 280/805 |
| 4,268,067 | 5/1981 | Thomas | 280/802 |
| 4,310,178 | 1/1982 | Sato | 280/802 |

FOREIGN PATENT DOCUMENTS

| 22468 | 1/1981 | European Pat. Off. |
| 1557535 | 4/1970 | Fed. Rep. of Germany |
| 2070601 | 9/1971 | France |
| 2070602 | 9/1971 | France |
| 142163 | 10/1980 | Japan |

Primary Examiner—Richard A. Bertsch

[57] ABSTRACT

There is disclosed an improved belt holder for a passive seat belt assembly, which connects first and second belts extending from different portions of a motor vehicle. The belt holder comprises a base plate fixed to the first belt and having spaced side walls, the side walls being formed with respective elongate slots at positions manually facing each other; a shaft passing through the elongate slots to span between the side walls, the second belt passing round the shaft, the shaft taking both a first position where the shaft is freely rotatable about the axis thereof permitting the second belt to be freely movable longitudinally with rotation of the shaft and a second position where the shaft tightly grips the second belt thereby fixing the second belt to the base plate; and means for holding the shaft in the first position until a predetermined magnitude of force is applied thereto.

12 Claims, 8 Drawing Figures

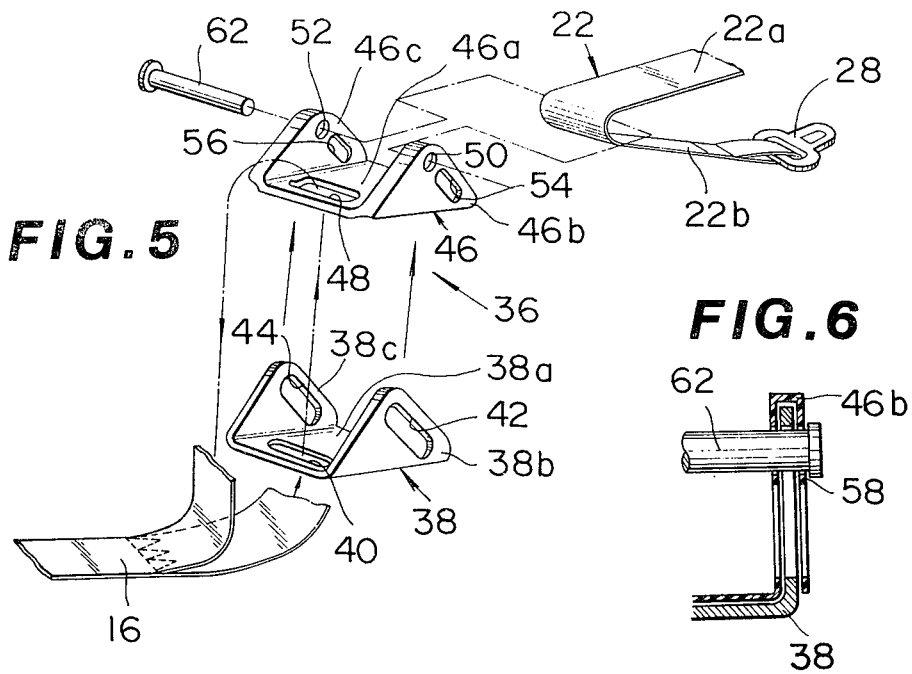
FIG. 5
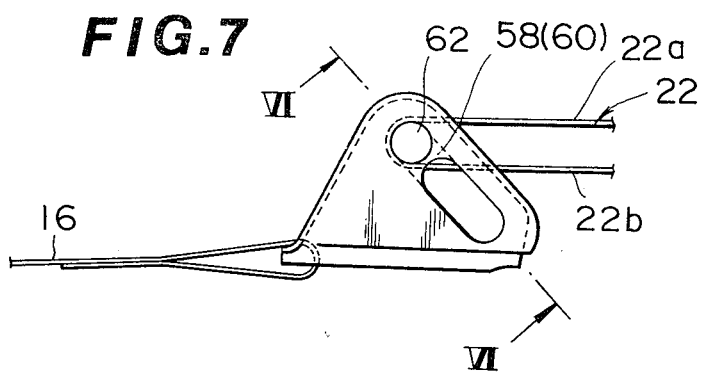
FIG. 6
FIG. 7
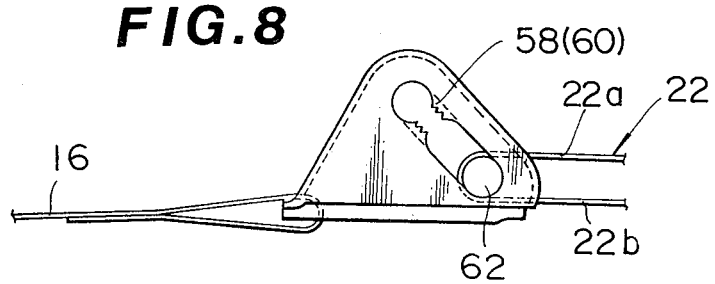
FIG. 8

SEAT BELT ASSEMBLY

BACKGROUND OF THE INVENTION

The present invention relates in general to a passive seat belt assembly of a motor vehicle, and more particularly to a passive seat belt assembly of a shoulder-and-lap restraining type.

SUMMARY OF THE INVENTION

It is an object of the present invention to provide a passive seat belt assembly of a motor vehicle, which assures safety restraining of the passenger upon a vehicle collision.

According to the present invention, there is provided a seat belt assembly for restraining a passenger on a seat of a motor vehicle. The assembly comprises first and second belts which extend from different portions of the vehicle; and a belt holder for connecting the first and second belts to divide the second belt into a shoulder restraining section and a lap restraining section, the belt holder comprising a base plate fixed to the first belt and having spaced side walls which stand on a base portion of the base plate, the side walls being formed with respective elongate slots at positions facing each other; a shaft passing through the elongate slots to span between the side walls, the second belt passing round the shaft, the shaft having both first position where the shaft is freely rotatable about the axis thereof permitting the second belt to be freely movable longitudinally with rotation of the shaft and a second position where the shaft tightly grips the second belt thereby fixing the second belt to the base plate; and means for holding the shaft in the first position until a predetermined magnitude of force is applied thereto.

According to the present invention, there is further provided a belt holder for connecting first and second belts. The holder comprises a base plate having spaced side walls which stand on a base portion of the base plate, the side walls being formed at positions facing each other with respective elongate slots which are inclined with respect to the base portion and terminate at positions near the base portion; a shaft passing through the elongate slots to span between the side walls, the shaft being slidable within and along the elongate slots; and means for holding the shaft in a predetermined position until a predetermined magnitude of force is applied thereto, the predetermined position being at a distance from the terminating ends of the elongate slots.

BRIEF DESCRIPTION OF THE DRAWINGS

Other objects and advantages of the present invention will become clear from the following description when taken in conjunction with the accompanying drawings, in which:

FIG. 5 is an exploded view of an improved belt holder employed in the passive seat belt of the present invention;

FIG. 6 is a sectional view taken along the line VI—VI of FIG. 7, showing an essential portion of the improved belt holder;

FIG. 7 is a side veiw of the improved belt holder in a normal condition; and

FIG. 8 is a side view of the improved belt holder in an emergency condition.

DESCRIPTION OF THE PRIOR ART

Prior to describing the invention, a conventional shoulder-and-lap restraining type passive seat belt assembly will be described with reference to FIGS. 1 to 4 in order to clarify the invention.

Figure 1:
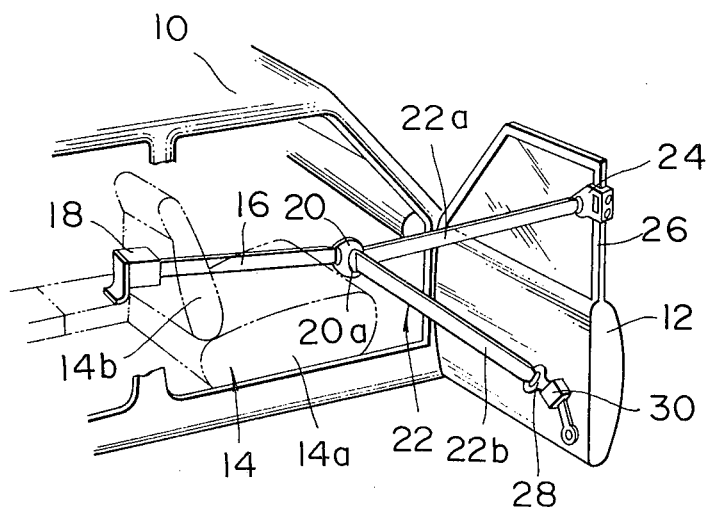
FIG. 1 is a perspective view of a typical passive seat belt assembly, of a shoulder-and-lap restraining type, installed in a motor vehicle.
Figure 2:
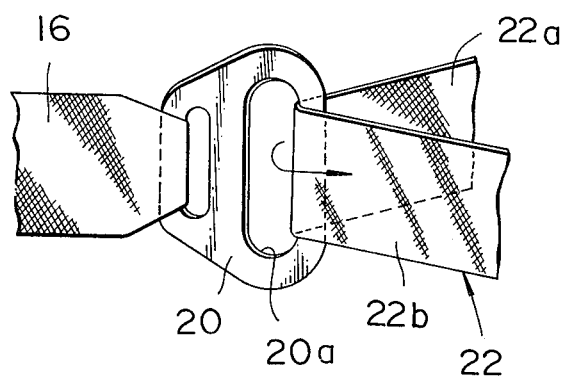
FIG. 2 is a perspective view of a conventional belt holder employed in the seat belt assembly in FIG. 1.

In FIG. 1, there is shown the conventional passive seat belt assembly of the shoulder-and-lap restraining type installed in a motor vehicle. The vehicle shown has a vehicle body 10, a door 12 hinged at its front portion to the body 10, and a seat 14 including a seat portion 14a and a seat back portion 14b, as shown.

Figure 3:
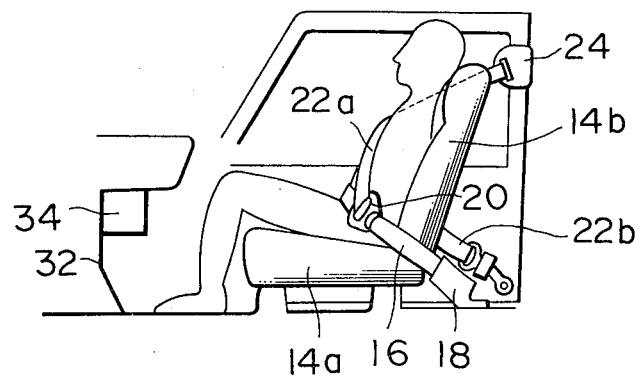
FIGS. 3 and 4 are drawings respectively depicting problems inherent in a passive seat belt assembly employing therein the conventional belt holder of FIG. 2.

The seat belt assembly comprises an inner belt or first belt 16 which is retractable by a belt retractor 18 mounted to an inboard side of the vehicle floor. The belt retractor 18 is of an emergency locking type which locks to inhibit the withdrawal of the belt 16 therefrom when a shock greater than a predetermined degree is applied thereto. The leading end of the inner belt 16 is equipped with a belt holder or a through ring 20 which has an elongate slot 20a formed therethrough. A webbing or second belt 22 is secured at its upper end through an anchor plate 24 to an upper portion of the door 12, that is, a window sash 26 of the door 12. The webbing 12 passes through the elongate slot 20a of the through ring 20 and is folded back by it to provide a shoulder belt section 22a and a lap belt section 22b. The leading end of the lap belt section 22b is equipped with a tongue member 28 which is engageable with a buckle membes 30 connected to a lower portion of the door 12. With not only the retractor 18 but also the through ring 20 through which the webbing 22 is slidable as is depicted by an arrow in FIG. 2, opening the door 12 induces a movement of the webbing 22 away from the seat 14 thereby to make the ingress and egress of the passenger easy, and closing the door 12 induces a movement of the webbing 22 toward the seat 14, and finally induces a passenger restraining condition of the webbing 22 as shown in FIG. 3.

However, the conventional seat belt assembly of the type mentioned above have the following several drawbacks by its inherent construction.

Figure 4:
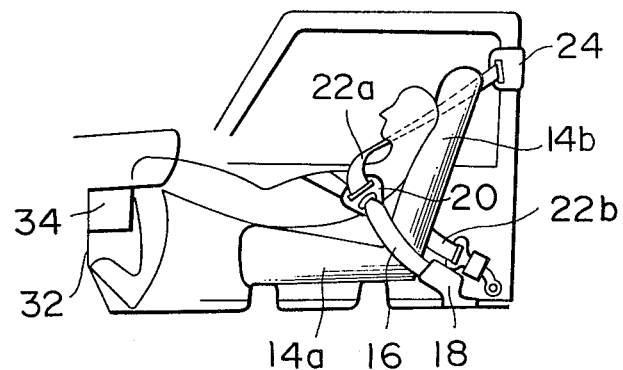

Because the through ring 20 is constantly ready for sliding movement relative to the webbing 22, there is a critical possibility, especially in a vehicle collision, that the through ring 20 slides in a direction to lengthen the lap belt section 22b, that is, in a direction to shorten the shoulder belt section 22a. Thus, as is shown by FIG. 4, a so-called submarine phenomenon in which the belt wearer slips into a front lower portion may occur causing the leg or legs of the wearer to violently hit against a dash panel 32 or an air conditioner 34 or the like. The submarine phenomenon may further cause violent bump of the wearer's head against the seat back portion 14b, and strangling of the wearer's neck by the webbing 22 as is seen from FIG. 4.

DESCRIPTION OF THE INVENTION

It is therefore an essential object of the present invention to provide an improved shoulder-and-lap restraining type passive seat belt assembly which is free of the above-mentioned drawbacks.

As will become clear as the description proceeds, the seat belt assembly according to the present invention has substantially the same construction as the conventional assembly of FIG. 1 except for the belt holder (through ring) by which the webbing is divided into the shoulder belt section and the lap belt section. Thus, the following description is directed to only the improved belt holder and its associated several parts.

Referring to FIG. 5, there is shown a belt holder 36 employed in the seat belt assembly of the present invention. The belt holder 36 comprises a base plate 38 which is constructed of a rigid material such as a steel plate. The base plate 38 has triangular parallel side walls 38b and 38c which are substantially perpendicularly to a base portion 38a of the plate 38. The base portion 38a is formed with an elongate slot 40, and the side walls 38b and 38c are formed with respective elongate slots 42 and 44 at mutually facing positions. As shown, the slots 42 and 44 are inclined suitably with respect to the base portion 38a and terminate at positions near the base portion 38a. Designated by numeral 46 is a cover of the base plate 38, which is constructed of a fragile material such as a plastics. As shown, the cover 46 has a shape similar to that of the base plate 38. As is clear from FIG. 6, the cover 46 has hollow parallel side walls 46b and 46c which are substantially perpendicular to a base portion 46a of the cover 46. The base portion 46a has an elongate slot 48 in a position corresponding to the position where the elongate slot 40 of the base plate 38 is located, and the hollow parallel side walls 46b and 46c have respective circular holes 50 and 52 in positions corresponding to the positions where the upper sections of the elongate slots 42 and 44 of the base plate 38 are located. The hollow parallel side walls 46b and 46c further have respective elongate slots 54 and 56 in positions which correspond to the areas where the lower half of the elongate slots 42 and 44 of the base plate 38 are located. It is now to be noted that the circular hole 50 or 52 is isolated from the corresponding elongate slot 54 of 56 by a partition wall 58 or 60 (see FIG. 7) lying therebetween. The cover 46 is snugly put on the base plate 38 to entirely cover the same. A shaft 62 passes through the coaxially aligned circular holes 52 and 50 with its both end portions received in the upper sections of the elongate slots 44 and 42 of the base plate 38, as is understood from FIG. 6. In order to prevent disengaging of the shaft 62 from the walls 46b and 46c, both ends of the shaft 62 are caulked or enlarged. With this construction, the shaft 62 spans between the parallel walls of the belt holder 36 at higher positions of the same and freely rotatable about the axis thereof relative to the walls.

Through the mated elongate slots 40 and 48 of the belt holder 36, an end portion of the inner belt 16 passes to be fastened to the belt holder 36. The webbing 22 extending from the upper portion of the door 12 (See FIG. 1) passes round the rotatable shaft 62 to provide the shoulder belt section 22a and the lap belt section 22b. The leading end of the lap belt section 22b is equipped with the tongue member 28 which is engageable with the buckle member 30 fixed to the lower portion of the door 12.

In the following, operation of the safety seat belt assembly of the present invention will be described with reference to FIGS. 7 and 8.

In normal condition, the shaft 62 round which the webbing 22 passes is rotatably supported by the circular holes 50 and 52 of the cover 46, as is shown by FIG. 7. Thus, under this condition, the webbing 22 is ready for sliding about the shaft 62, so that the suitable restraining position is achieved by the seat belt assembly in accordance with the physical constitution of the belt wearer and the position of the seat 14.

When a great tension is suddenly applied to the seat belt assembly, due to, for example, a vehicle collision, the shaft 62 is compelled to receive the great tension thereby breaking the fragile partition walls 58 and 60 of the cover 46 and instantly comes to the depth positions of the elongate slots 42 and 44 of the base plate 38. Under this condition, the webbing 22 is gripped by the shaft 62 which is pressed toward the base portion 46a of the cover 46 thereby stopping the sliding movement of the webbing 22 round the shaft 62. Thus, the above-mentioned problems inherent in the conventional seat belt assembly do not occur in the present invention because of the locking connection between the webbing 22 and the belt holder 36 at a vehicle collision. For assuring the locking connection therebetween, the surface of the base portion 46a of the cover 46 may be granulated.

Some modifications are available in the present invention. The partition walls 58 and 60 may have respective slits each extending from the circular hole 50 or 52 to the corresponding elongate slot 54 or 56 in order to assure the instant movement of the shaft 62 from the holes 50 and 52 to the elongate slots 54 and 56 at the vehicle collision. As a substitute for the partition walls 58 and 60, inward projections may be formed at the corresponding positions. Further, the elongate slots 42 and 44 of the base plate 38 may be provided with the partition walls or the projections similar to the above. In this case, the above-mentioned desired function is expected without the cover 46.

What is claimed is:

1. A seat belt assembly for restraining a passenger on a seat of a motor vehicle, comprising:
first and second belts to be connected to different portions of said vehicle; and
a belt holder for holding said first and second belts in a manner to divide said second belt into a shoulder restraining section and a lap restraining section, said belt holder comprising a base plate fixed to said first belt and having spaced side walls which stand on a base portion of said base plate, said side walls being formed with respective elongate slots at positions facing each other; a shaft passing through said elongate slots to span said side walls, said second belt passing around said shaft, said shaft assuming selectively a first position wherein said shaft is freely rotatable about the axis thereof permitting said second belt to be freely movable longitudinally with rotation of said shaft, and a second position wherein said shaft tightly grips said second belt thereby fixing said second belt relative to said base plate; and means for holding said shaft in said first position until a predetermined magnitude of force is applied thereto, said holding means comprising a partition wall extending across each of said elongate slots to divide each slot into first and second sections, said partition wall being easily deformed when the predetermined magnitude of force is applied thereto by said shaft.

2. A seat belt assembly as claimed in claim 1, in which said partition wall is constructed of a plastics.

3. A seat belt assembly as claimed in claim 1, in which said partition wall is one of integrated parts which constitute a plastic cover of said base plate.

4. A seat belt assembly as claimed in claim 3, in which said cover has a shape matching said base plate.

5. A seat belt assembly as claimed in claim 4, in which said cover comprises spaced side walls which stand on a base portion of said cover, said spaced side walls of said cover being formed with respective circular holes in positions corresponding to the positions where the first sections of the elongate slots of the base plate are located, further said spaced side walls of said cover being formed with respective elongate slots in positions corresponding to the area where the second sections of the elongate slots of said base plate are located, so that said circular holes and said elongate slots of said cover are partitioned by said partition walls.

6. A seat belt assembly as claimed in claim 5, in which each of said partition walls is formed with a slit which extends from the corresponding circular hole and the corresponding elongate slot of the cover.

7. A seat belt assembly as claimed in claim 5, in which each of said side walls of said cover is hollow.

8. A seat belt assembly as claimed in claim 1, in which each of said elongate slots of said base plate is inclined with respect to the base portion of said base plate.

9. A seat belt assembly as claimed in claim 1, in which said first belt is retractable by a belt retractor mounted in the motor vehicle, said second belt being fixed at one end to an upper portion of a hinged door of said vehicle and connectable at the other end to a lower portion of said door.

10. A belt holder for connecting first and second belts, comprising:
   a base plate having spaced side walls which stand on a base portion of said base plate, said side walls being formed at positions facing each other with respective elongate slots which are inclined with respect to said base portion and terminate at positions near said base portion;
   a shaft passing through said elongate slots to span between said side walls, said shaft being slidable within and along the elongate slots; and
   means for holding said shaft in a predetermined position until a predetermined magnitude of force is applied thereto, said predetermined position being at a distance from the terminating ends of said elongate slots.

11. A belt holder as claimed in claim 10, in which said means comprises a partition wall extending across each of said elongate slots to divide each elongate slot into first and second sections, said partition wall being easily deformed when a predetermined magnitude of force is applied thereto by said shaft.

12. A belt holder as claimed in claim 11, in which said partition wall is one of integrated parts which constitute a plastic cover which covers said base plate.

* * * * *